United States Patent
Nishiura et al.

(10) Patent No.: US 9,796,819 B2
(45) Date of Patent: Oct. 24, 2017

(54) PROCESS FOR PRODUCING WET MASTERBATCH, AND WET MASTERBATCH PRODUCED BY SAID PROCESS

(71) Applicant: BRIDGESTONE CORPORATION, Tokyo (JP)

(72) Inventors: Fumiteru Nishiura, Tokyo (JP); Yukari Kanda, Tokyo (JP); Kazuaki Someno, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/309,027

(22) PCT Filed: Apr. 3, 2015

(86) PCT No.: PCT/JP2015/060661
§ 371 (c)(1),
(2) Date: Nov. 4, 2016

(87) PCT Pub. No.: WO2015/170540
PCT Pub. Date: Nov. 12, 2015

(65) Prior Publication Data
US 2017/0073477 A1 Mar. 16, 2017

(30) Foreign Application Priority Data
May 8, 2014 (JP) ................................. 2014-097197

(51) Int. Cl.
| | | |
|---|---|---|
| C08J 3/215 | (2006.01) | |
| C08J 3/22 | (2006.01) | |
| C08L 21/02 | (2006.01) | |
| C08K 3/04 | (2006.01) | |

(52) U.S. Cl.
CPC .......... *C08J 3/22* (2013.01); *C08K 3/04* (2013.01); *C08L 21/02* (2013.01); *C08J 2307/02* (2013.01); *C08J 2321/02* (2013.01); *C08K 2201/006* (2013.01)

(58) Field of Classification Search
CPC ........... C08J 3/22; C08J 2307/02; C08K 3/04; C08K 2201/006
See application file for complete search history.

(56) References Cited

U.S. PATENT DOCUMENTS

| | | | |
|---|---|---|---|
| 4,820,751 A | 4/1989 | Takeshita et al. | |
| 2008/0159947 A1* | 7/2008 | Yurovskaya | .............. C09C 1/50 423/449.2 |
| 2010/0311898 A1 | 12/2010 | Yamada et al. | |

FOREIGN PATENT DOCUMENTS

| | | |
|---|---|---|
| JP | 2008-269850 A | 11/2008 |
| JP | 2011-016874 A | 1/2011 |
| JP | 2014-031448 A | 2/2014 |
| JP | 2014-234469 A | 12/2014 |
| JP | 2015-007227 A | 1/2015 |
| WO | 2009/072413 A1 | 6/2009 |

OTHER PUBLICATIONS

Machine Translation of JP 2015/007227 (2015).*
International Search Report of PCT/JP2015/060661 dated Jun. 30, 2015.
Communication dated Mar. 14, 2017, from the European Patent Office in counterpart European Application No. 15789926.1.

* cited by examiner

*Primary Examiner* — Hannah Pak
(74) *Attorney, Agent, or Firm* — Sughrue Mion, PLLC

(57) ABSTRACT

Provided is a process for producing a wet masterbatch which, without deteriorating a reinforcing property of a rubber composition and rubber physical properties, micronizes a filler slurry by controlling an amount of functional groups on a filler surface, and improves filler dispersibility in the rubber wet masterbatch and the rubber composition. The process for producing a wet masterbatch comprises: a step of producing a slurry solution having a pH of 8 or more by dispersing carbon black having an average amount of surface acidic functional groups ($\mu$eq/m$^2$) of 0.15 or more and less than 3.00; a step of producing a mixture by mixing the slurry solution and a rubber latex solution in a liquid phase; and a step of drying the mixture.

16 Claims, No Drawings

PROCESS FOR PRODUCING WET MASTERBATCH, AND WET MASTERBATCH PRODUCED BY SAID PROCESS

CROSS REFERENCE TO RELATED APPLICATIONS

This application is a National Stage of International Application No. PCT/JP2015/060661 filed Apr. 3, 2015, claiming priority based on Japanese Patent Application No. 2014-097197 filed May 8, 2014, the contents of all of which are incorporated herein by reference in their entirety.

TECHNICAL FIELD

The present invention relates to a process for producing a wet masterbatch and a wet masterbatch produced by the process, especially to a process for producing a wet masterbatch containing carbon black and a wet masterbatch produced by the process.

BACKGROUND ART

Traditionally, it has been known in the field of rubber production to use a wet masterbatch in order to improve workability and filler dispersibility when producing a rubber composition containing filler such as carbon black and the like. The wet masterbatch refers to a material obtained by: mixing a filler-containing slurry solution and a rubber latex solution in a liquid phase, the filler-containing slurry solution being prepared by mixing beforehand the filler and a dispersion solvent in a specific ratio and dispersing the filler in the dispersion solvent by a mechanical force; and thereafter coagulating the mixture by adding thereto a coagulating agent such as an acid and the like, and recovering and drying the coagulated material.

When a wet masterbatch is used, there is provided a characteristic that, compared to a conventional rubber composition obtained by mixing in a solid phase, a rubber composition is obtained which has excellent filler dispersibility, and excellent rubber physical properties such as processability, a reinforcing property, and the like. By using as a raw material a rubber composition using a wet masterbatch, it can be expected, for example, that rubber products such as tire and the like, having reduced rolling resistance and excellent fatigue resistance and abrasion resistance, are produced.

According to a conventional method for producing a wet masterbatch, there have been some cases where an excessive shear force and impact force are exerted on the filler in a step of micronizing the filler slurry. When excessive force is exerted on the filler in the micronization step, there has been a problem that a structure of the filler is destroyed and its rubber reinforcing property deteriorates significantly. Therefore, in order to prevent destruction of the filler structure, micronization of the filler slurry may be suppressed. In this case, however, there arises a problem that dispersibility of the filler in the rubber composition becomes insufficient, and the rubber physical properties deteriorate.

In a field of an aqueous pigment ink, a technique of applying surface-treated carbon black has been proposed as a method for fining a particle size of a filler slurry such as carbon black and the like. However, this technique does not take into account the rubber reinforcing property and the like.

Furthermore, a wet masterbatch using a filler slurry micronized by surface treated carbon black has also been proposed. However, it has not been mentioned that there is an optimum region in carbon colloidal with regard to a relationship between surface functional groups and slurry micronization (see, for example, Patent Literature 1).

CITATION LIST

Patent Literature

PTL 1: Japanese Patent Laid-Open No. 2011-16874

SUMMARY OF INVENTION

Technical Problem

The present invention was made in order to solve the problems described above, and has an object of providing a process for producing a wet masterbatch which, without deteriorating a reinforcing property for a rubber composition and rubber physical properties, micronizes a filler slurry by controlling an amount of functional groups on a filler surface, and improves filler dispersibility in the rubber wet masterbatch and the rubber composition. The present invention also has an object of providing a wet masterbatch produced by the above method.

Solution to Problem

The present inventors have discovered that there is an optimum region between an amount of functional groups on a filler surface and physical properties of a rubber composition using a wet masterbatch, and that there is an optimum region between an amount of functional groups on a filler surface and micronization of a filler slurry. Thereupon, the present inventors have found that the problems can be solved by specifying the amount of functional groups on the surface of the filler, which satisfies both of the physical properties of the rubber composition and micronization of the filler slurry. This led to completion of the present invention.

The present invention provides the following [1] to [10].

[1] A process for producing a wet masterbatch comprising: a step of producing a slurry solution having a pH of 8 or more by dispersing carbon black having an average amount of surface acidic functional groups ($\mu$eq/m$^2$) of 0.15 or more and less than 3.00; a step of producing a mixture by mixing the slurry solution and a rubber latex solution in a liquid phase; and a step of drying the mixture.

[2] The process for producing a wet masterbatch according to [1], wherein the carbon black has a DBP oil absorption amount (ml/100 g) of 100 or less.

[3] The process for producing a wet masterbatch according to [1] or [2], wherein the pH of the slurry solution is 9 or more.

[4] The process for producing a wet masterbatch according to any one of [1] to [3], wherein the carbon black has an average amount of surface acidic functional groups ($\mu$eq/m$^2$) of 0.20 or more and 2.00 or less.

[5] The process for producing a wet masterbatch according to any one of [1] to [4], comprising a step of introducing acidic functional groups on a surface of the carbon black by a gas phase ozone treatment.

[6] The process for producing a wet masterbatch according to [5], wherein the gas phase ozone treatment is performed under an ozone atmosphere of 0.1% or more and 16% or less.

[7] The process for producing a wet masterbatch according to any one of [1] to [6], wherein, when an STSA (m$^2$/g) of the carbon black is 120 or more, the step of producing a slurry solution comprises dispersing the carbon black in a basic aqueous solution prepared by mixing water and a base.

[8] The process for producing a wet masterbatch according to [7], wherein an amount of the base is, relative to a total amount of the slurry solution, 0.06% by mass or more and 0.1% by mass or less.

[9] The process for producing a wet masterbatch according to [7] or [8], wherein a frequency of micronized slurry having a particle size of 1 μm or less in the slurry solution is 65% or more.

[10] A wet masterbatch produced by the method for producing a wet masterbatch according to any one of [1] to [9] above.

Advantageous Effects of Invention

According to the present invention, there can be provided a process for producing a wet masterbatch which, without deteriorating a reinforcing property for a rubber composition and rubber physical properties, micronizes a filler slurry by controlling an amount of functional groups on a filler surface, and improves filler dispersibility in the rubber wet masterbatch and the rubber composition, and there can be provided a wet masterbatch produced by the process.

DESCRIPTION OF EMBODIMENTS

[Method for Producing Wet Masterbatch]

The method for producing a wet masterbatch pertaining to an embodiment of the present invention comprises: a step of producing a slurry solution having a pH of 8 or more by dispersing carbon black having an average amount of surface acidic functional groups (μeq/m$^2$) of 0.15 or more and less than 3.00; a step of producing a mixture by mixing the slurry solution and a rubber latex solution in a liquid phase; and a step of drying the mixture.

<Step of Producing Slurry Solution>

The carbon black used in the step of producing a slurry solution has an average amount of surface acidic functional groups (μeq/m$^2$) of 0.15 or more and less than 3.00. If the average amount of surface acidic functional groups is less than 0.15, a particle size distribution of the slurry solution cannot be fined and, if the average amount of surface acidic functional groups is 3.00 or more, the reinforcing property for a polymer (rubber) is deteriorated, which are not preferable. The average amount of surface acidic functional groups of the carbon black is, from a viewpoint of making the particle size distribution of the slurry solution finer and preventing the reinforcing property from deterioration, preferably 0.20 or more and 2.00 or less, and more preferably 0.3 or more and 1.5 or less. Micronization of the carbon black can be achieved by increasing its hydrophilicity by introduction of acidic functional groups on its surface.

As a means for quantifying the amount of acidic functional groups, there may be mentioned, for example, a method proposed by Boehm and others.

<Method of Boehm and Others>

In a flask, 10 g of carbon black and 50 g of a 0.01 mol/L aqueous $C_2H_5ONa$ solution are stirred for 2 hours, and thereafter the mixture is allowed to stand at room temperature for 22 hours. After standing, the mixture is stirred for further 30 minutes, and then filtered to recover a filtrate. The recovered filtrate (25 mL) is neutralization titrated with a 0.01 mol/L aqueous HCl solution, and an amount (mL) of the aqueous HCl solution required for the pH to reach 4.0 is measured. From the amount of the aqueous HCl solution and the following formula (1), the average amount of surface acidic functional groups (meq/kg) is calculated:

Amount of acidic functional groups=(25−(amount of aqueous HCl solution))×2    (1)

The average amount of surface acidic functional groups is a value obtained by dividing the amount of acidic functional groups measured by the above method by a nitrogen adsorption specific surface area of the carbon black, and is represented in terms of equivalents per unit area (μeq/m$^2$).

(Nitrogen Adsorption Specific Surface Area)

The nitrogen adsorption specific surface area is measured in accordance with JIS K 6217(1997).

The carbon black, from a viewpoint that it becomes easy to be micronized by an influence of effects of colloidal characteristics and the surface acidic functional groups, preferably has a dibutyl phthalate oil absorption amount (DBP oil absorption amount) (ml/100 g) of 100 or less.

The carbon black, from a viewpoint of the rubber reinforcing property, preferably has an STSA (Statistical Thickness Surface Area) (m$^2$/g) of 30 or more and 300 or less.

When producing a slurry solution using carbon black having an STSA (m$^2$/g) of 120 or more, if water and carbon black are mixed first, there arises a problem that the slurry solution tends to re-coagulate and a sufficient frequency of micronized slurry cannot be acquired. Therefore, when the STSA (m$^2$/g) is 120 or more, it is preferable to disperse the carbon black in a basic aqueous solution prepared by mixing water and a base. By using a basic aqueous solution prepared by mixing water and a base, a sufficient frequency of micronized slurry can be obtained even when the carbon black has an STSA (m$^2$/g) of 120 or more. Here, the sufficient frequency of micronized slurry refers to a frequency of the carbon black in a masterbatch being improved in dipersibility and of rubber physical properties (abrasion resistance index) being improved, and specifically refers to a frequency of micronized slurry having a particle size of 1 μm or less in the slurry solution being 65% or more. In addition, when water and the carbon black were mixed first and a base was added thereto later, the frequency of micronized slurry having a particle size of 1 μm or less in the slurry solution could not be secured.

As the base used in the basic aqueous solution, there may suitably be mentioned sodium hydroxide, ammonia, and the like.

An amount of the base added to the basic aqueous solution relative to a total amount of the slurry solution is, from a viewpoint of securing the frequency of micronized slurry and improving rubber physical properties of the masterbatch, preferably 0.06% by mass or more and 0.1% by mass or less, more preferably 0.08% by mass or more and 0.1% by mass or less, and even more preferably 0.08% by mass or more and 0.09% by mass or less.

As the carbon black used in the step of producing a slurry solution, there can be used carbon black for color. Further, as the carbon black, there can be used various grades of carbon black including, for example, SAF, HAF, ISAF, FEF, GPF, and the like singly or as a mixture.

In a stage of slurrying the carbon black having acidic functional groups introduced, there is employed, in order to maintain the micronized carbon black stably, a method of ionizing the acidic functional groups by adjusting the pH of the slurry to 8 or more by adding sodium hydroxide and the like. When the pH is less than 8, the carbon black having acidic functional groups introduced becomes coagulated and is not preferable. The pH of the slurry solution is, from a viewpoint of maintaining micronized carbon black stably, preferably 9 or more.

A technique for introducing acidic functional groups is not particularly limited, and there can be mentioned a liquid phase oxidation treatment, a gas phase oxidation treatment, and the like. However, the acidic group introduction is preferably performed by a gas phase ozone treatment. This is because the gas phase ozone treatment is of lower cost than the liquid phase oxidation treatment and enables efficient introduction of carboxyl groups. The gas phase ozone treatment refers to oxidation of carbon black in a dry state by contacting the same with an ozone gas. The carbon black subjected to the gas phase ozone treatment includes, for example, SBX 45 produced by ASAHI CARBON CO., LTD.

An oxidation treatment of the carbon black is preferably performed by a treatment where dried carbon black is exposed to an ozone atmosphere of 0.1% or more and 16% or less. A treatment temperature in the oxidation treatment of the carbon black under the ozone atmosphere is normal temperature to 100° C., and a treatment time is 10 to 300 seconds. Because this oxidation treatment of the carbon black is a technique of oxidizing dried carbon black directly with an ozone gas, after-treatments (washing with water and drying) are not indispensable, and this treatment is efficient and simple and also suppresses cost.

The carbon black slurry is preferably one obtained by dispersing the carbon black in the absence of a dispersant. The dispersant may be used in order to disperse the carbon black stably, but it is preferable not to add the dispersant by, for example, using carbon black treated by a gas phase ozone treatment. By not using a dispersant, a fear is eliminated that there may be brought about deterioration of breaking strength of a rubber product produced by using the produced wet masterbatch as a raw material and, furthermore, the production cost can also be reduced. Here, the "dispersant" refers to a surfactant and a resin added for a purpose of dispersing carbon black stably in a carbon black slurry, and specifically there may be mentioned: anionic polymers such as a polyacrylic acid salt, a salt of a styrene-acrylic acid copolymer, a salt of a vinylnaphthalene-acrylic acid copolymer, a salt of a styrene-maleic acid copolymer, a salt of a vinylnaphthalene-maleic acid copolymer, a sodium salt of a β-naphthalenesulfonic acid-formalin condensate, a salt of polyphosphoric acid, and the like; nonionic polymers such as polyvinyl alcohol, polyvinyl pyrrolidone, polyethylene glycol, and the like; proteins such as gelatin, albumin, casein, and the like; water soluble natural rubber such as gum arabic, tragant gum, and the like; glucosides such as saponin and the like; cellulose derivatives such as methylcellulose, carboxymethylcellulose, hydroxymethylcellulose, and the like; and natural polymers such as a ligninsulfonic acid salt, shellac, and the like.

When producing a water-dispersed slurry solution of carbon black, there are used a rotor/stator type high shear mixer, a high pressure homogenizer, an ultrasonic homogenizer, a colloid mill, and the like. For example, by adding specified amounts of filler and water in the colloid mill, followed by stirring for a certain time at a high speed, the slurry solution can be prepared.

A particle size distribution of carbon black in the water-dispersed slurry solution is preferably such that a 90 volume % particle size (D90) as a volume average particle size is 1.0 µm or less. More preferably, the 90 volume % particle size (D90) as a volume average particle size is 0.5 µm or less. If the particle size is too large, dispersion of carbon black in rubber becomes worse and sometimes results in deterioration of the reinforcing property and abrasion resistance.

On the other hand, if excessive shear force is exerted on the slurry in order to make the particle size smaller, a structure of the carbon black is destroyed to cause deterioration of the reinforcing property. From such a viewpoint, a DBP oil absorption amount of the filler, recovered from a water dispersion slurry solution and dried, is preferably 93% or more, and more preferably 96% or more relative to the DBP oil absorption amount of carbon black before being added into the slurry.

<Step of Producing Mixture>

The step of producing a mixture is a step where a mixture is produced after preparing a mixed liquid of a slurry solution having carbon black dispersed and a rubber latex solution containing a rubber component.

As the rubber latex solution used in the step of producing a mixture, there may be mentioned natural rubber latex and/or synthetic rubber latex, an organic solvent solution of synthetic rubber obtained by solution polymerization, or the like. Among these, the natural rubber latex and/or the synthetic rubber latex are suitable from a viewpoint of performance of a wet masterbatch obtained, ease of production, and the like.

As the natural rubber latex, there can be used any of field latex, ammonia-treated latex, centrifugally separated and concentrated latex, deproteinized latex treated with an enzyme, a combination of the above latexes, and the like.

As the synthetic rubber latex, there can be used, for example, latex of styrene-butadiene copolymer rubber, synthetic polyisoprene rubber, polybutadiene rubber, nitrile rubber, polychloroprene rubber, or the like.

As a method for mixing the slurry solution and the rubber latex solution, there may be mentioned, for example, a method where the slurry solution is charged in a homomixer and, while stirring, the rubber latex solution is dropwise added thereto, or conversely a method where, while stirring the rubber latex solution, the slurry solution is dropwise added thereto. Further, there can be used a method of mixing a slurry flow and a latex flow having a certain flow rate ratio under a condition of vigorous hydraulic stirring. Furthermore, there can also be used a method of mixing the slurry flow and the latex flow by a static mixer, a high shear mixer, and the like.

A method for coagulating the wet masterbatch after performing the above mixing is carried out as usual by using a coagulating agent including: an acid such as formic acid, sulfuric acid, and the like; and a salt such as sodium chloride and the like. Alternatively, in the present invention, there are cases where coagulation is achieved without addition of the coagulating agent by mixing the slurry solution and the rubber latex solution.

<Step of Drying Mixture>

In the step of drying the mixture, there can be used a usual dryer such as a vacuum dryer, an air dryer, a drum dryer, a band dryer, and the like. However, in order to improve dispersibility of the carbon black, it is preferable to perform drying while applying a mechanical shear force. By this, there can be obtained rubber having excellent workability, reinforcing property, and rubber physical properties. Even though this drying can be performed by using a general kneader, it is preferable to use a continuous kneader from a viewpoint of industrial productivity. Further, it is more preferable to use a same direction rotary or different direction rotary multiaxial kneading extruder, and it is especially preferable to use a biaxial kneading extruder.

In this way, a wet masterbatch using an oxidation-treated carbon black can be produced efficiently.

[Rubber Composition]

The rubber composition pertaining to an embodiment of the present invention is obtained by compounding a wet masterbatch obtained by the above-mentioned method of the present invention by using the oxidation-treated carbon black. To the rubber composition, in a range which does not impair the purpose of the present invention, there may be added various chemicals usually used in the rubber industry such as a vulcanizing agent, a vulcanization accelerator, an antioxidant, process oil, zinc oxide, a scorch-preventing agent, stearic acid, and the like.

Further, in the rubber composition, it is preferable that a rubber component in the above wet masterbatch is contained in a content of 30% by mass or more relative to a total of the rubber components. As other rubber components used in addition to the wet masterbatch, there may be mentioned usual natural rubber and diene-based synthetic rubber. As the diene-based synthetic rubber, there may be mentioned, for example, a styrene-butadiene copolymer (SBR), polybutadiene (BR), polyisoprene (IR), butyl rubber (IIR), an ethylene-propylene copolymer, a mixture of these, and the like.

As the vulcanizing agent, there may be mentioned sulfur and the like, and its amount of use as sulfur is, relative to 100 parts by mass of the rubber components, preferably 0.1 part by mass or more and 10.0 parts by mass or less, and more preferably 0.5 part by mass or more and 5.0 parts by mass or less.

The vulcanization accelerator which can be used in the present invention is not particularly limited, but there may be mentioned, for example, a thiazole-based vulcanization accelerator such as M (2-mercaptobenzothiazole), DM (dibenzothiazyl disulfide), CZ (N-cyclohexyl-2-benzothiazyl sulfenamide), NS (N-t-butyl-2-benzothiazyl sulfenamide), and the like; or a guanidine-based vulcanization accelerator such as DPG (diphenylguanidine) and the like. Its amount of use is, relative to 100 parts by mass of the rubber components, preferably 0.1 part by mass or more and 5.0 parts by mass or less, and more preferably 0.2 part by mass or more and 3.0 parts by mass or less.

The antioxidant which can be used in the present invention is not particularly limited, but there may be mentioned, for example, an amine-based one, a phenol-based one, an organic phosphite-based one, a thioether-based one, or the like. Its amount of use is, relative to 100 parts by mass of the rubber components, preferably 0.1 part by mass or more and 5.0 parts by mass or less, and more preferably 0.5 part by mass or more and 3.0 parts by mass or less.

The rubber composition of the present invention can be used not only for tire application but also for applications such as vibration absorbing rubber, belts, hoses, other industrial products, and the like. Especially, it is suitably used as rubber for tires and can be applied to all kinds of tire members such as, for example, tread rubber, side rubber, ply coating rubber, bead filler rubber, belt coating rubber, and the like.

EXAMPLES

Next, the present invention will be explained in more detail with reference to examples, but the present invention is not limited in any way by these examples.

Various measurements in Examples 1 to 15 and Comparative Examples 1 to 9 were performed by the following methods.

(1) Property Measurement of Carbon Black (DBP Oil Absorption Amount (ml/100 g) and STSA ($m^2/g$))

The DBP oil absorption amount was measured in accordance with ISO 6894:1991.

The STSA was measured in accordance with JIS 6217-7:2013.

(2) Measurement of Particle Size Distribution of Filler in Slurry Solution (90 Volume % Particle Size (D90))

The particle size distribution was measured by using a laser diffraction type particle size distribution meter (MICROTRAC FRA TYPE) using a water solvent (refractive index: 1.33). A particle refractive index of 1.57 was used in all measurements. Further, in order to prevent the filler from re-coagulation, the measurement was carried out immediately after dispersion.

(3) Crack Propagation Resistance

The larger the value of crack propagation resistance, the higher is the reinforcing property.

(4) Heat Generating Property (Tan δ)

By using a spectrometer manufactured by TOYOSEIKI CO., LTD., tan δ was obtained (dynamic strain amplitude: 1%, frequency: 52 Hz, and measurement temperature: 25° C.), and a heat generation index was calculated according to the following formula (2):

Heat generation index=(tan δ of test piece)/(tan δ of test piece of Comparative Example 1)　　(2)

The smaller the value of the heat generation index, the lower is the heat generating property, which is excellent.

Example 1

(1) Preparation of Slurry Solution

As an oxidation treatment of carbon black, dried carbon black ("SB 700" produced by ASAHI CARBON CO., LTD.) was exposed to a 9% ozone atmosphere. In the oxidation treatment of the carbon black, the treatment temperature was 25° C. and the treatment time was 30 seconds. An average amount of surface acidic functional groups of the oxidation-treated carbon black was 1.3 ($\mu eq/m^2$), the DBP oil absorption amount was 55 (ml/100 g), and the STSA was 120 ($m^2/g$).

The oxidation-treated carbon black was added to water in a proportion of 10% by mass and was micro-dispersed by means of a high shear mixer ("LX 800" manufactured by SILVERSON MACHINES INC.) to prepare a slurry solution. Here at, the pH of the slurry solution was set to 10.0. A particle size distribution of carbon black in the slurry solution obtained was such that D90 (90 volume % particle size)=0.3 μm.

(2) Preparation of Wet Masterbatch

After mixing 10 kg of the slurry solution prepared in the above (1) and 10 kg of natural rubber latex diluted to 10% by mass while stirring, the mixture was adjusted to pH 4.5 with formic acid to be coagulated. The coagulated material was separated by filtration and washed thoroughly to obtain 900 g of a wet coagulated material. Thereafter, a masterbatch using the oxidation-treated carbon black was produced by feeding, every 1 minute, 60 g (solid content: 30 g) each of the wet coagulated material weighed into a measuring cup into a biaxial continuous kneader "KTX-30" manufactured by KOBE STEEL, LTD. In this masterbatch, a content of the carbon black was 60 parts by mass per 100 parts by mass of the natural rubber latex.

(3) Preparation of Rubber Composition

To 160 parts by mass of the wet masterbatch prepared in (2) above, having carbon black blended, were added 1 part by mass of an antioxidant (N-phenyl-N'-(1,3-dimethylbutyl)-p-phenylenediamine, "NOCRAC 6C" produced by OUCHI SHINKO KAGAKU KOGYO CO., LTD.), 3 parts by mass of zinc oxide ("ZINC OXIDE (JIS NO. 1))," produced by HAKUSUITECH, CO., LTD.), 1 part by mass of stearic acid (produced by NOF CORPORATION), 1 part by mass of a vulcanization accelerator (N-cyclohexyl-2-benzothiazolyl sulfenamide, "NOCCELER CZ-G" produced by OUCHI SHINKO KAGAKU KOGYO CO., LTD.), and 2.2 parts by mass of sulfur (produced by KARUIZAWA SEIRENSHO CO., LTD.), and the mixture was kneaded by an internal mixer to obtain a rubber composition. The rubber composition obtained was subjected to evaluation of crack resistance and a heat generating property. The results are shown in the following Table 1.

Example 2

In Example 2, the same operation as in Example 1 was performed except that the carbon black ("SB 700" produced by ASAHI CARBON CO., LTD.) was oxidation-treated to make the average amount of surface acidic functional groups be 0.2 ($\mu$eq/m$^2$). The oxidation-treated carbon black in Example 2 had a DBP oil absorption amount of 55 (ml/100 g) and an STSA of 120 (m$^2$/g). Evaluation results of rubber physical properties in Example 2 are shown in Table 1.

Example 3

In Example 3, the same operation as in Example 1 was performed except that the carbon black ("SBX 45" produced by ASAHI CARBON CO., LTD.) was oxidation-treated to make the average amount of surface acidic functional groups be 0.6 ($\mu$eq/m$^2$). The oxidation-treated carbon black in Example 3 had a DBP oil absorption amount of 55 (ml/100 g) and an STSA of 120 (m$^2$/g). Evaluation results of rubber physical properties in Example 3 are shown in Table 1.

Example 4

In Example 4, the same operation as in Example 1 was performed except that the carbon black ("SB 700" produced by ASAHI CARBON CO., LTD.) was oxidation-treated to make the average amount of surface acidic functional groups be 2.9 ($\mu$eq/m$^2$). The oxidation-treated carbon black in Example 4 had a DBP oil absorption amount of 55 (ml/100 g) and an STSA of 120 (m$^2$/g). Evaluation results of rubber physical properties in Example 4 are shown in Table 1.

Example 5

In Example 5, the same operation as in Example 1 was performed except that the carbon black ("SBX 15" produced by ASAHI CARBON CO., LTD.) was oxidation-treated to make the average amount of surface acidic functional groups be 1.2 ($\mu$eq/m$^2$). The oxidation-treated carbon black in Example 5 had a DBP oil absorption amount of 96 (ml/100 g) and an STSA of 115 (m$^2$/g). Evaluation results of rubber physical properties in Example 5 are shown in Table 1.

Example 6

In Example 6, the same operation as in Example 1 was performed except that the carbon black ("SBX 15" produced by ASAHI CARBON CO., LTD.) was oxidation-treated to make the average amount of surface acidic functional groups be 0.7 ($\mu$eq/m$^2$). The oxidation-treated carbon black in Example 6 had a DBP oil absorption amount of 96 (ml/100 g) and an STSA of 115 (m$^2$/g). Evaluation results of rubber physical properties in Example 6 are shown in Table 1.

Example 7

In Example 7, the same operation as in Example 1 was performed except that the carbon black ("SBX 15" produced by ASAHI CARBON CO., LTD.) was oxidation-treated to make the average amount of surface acidic functional groups be 2.9 ($\mu$eq/m$^2$). The oxidation-treated carbon black in Example 7 had a DBP oil absorption amount of 96 (ml/100 g) and an STSA of 115 (m$^2$/g). Evaluation results of rubber physical properties in Example 7 are shown in Table 1.

Example 8

In Example 8, the same operation as in Example 1 was performed except that the carbon black ("SB 910" produced by ASAHI CARBON CO., LTD.) was oxidation-treated to make the average amount of surface acidic functional groups be 1.2 ($\mu$eq/m$^2$). The oxidation-treated carbon black in Example 8 had a DBP oil absorption amount of 55 (ml/100 g) and an STSA of 280 (m$^2$/g). Evaluation results of rubber physical properties in Example 8 are shown in Table 1.

Example 9

In Example 9, the same operation as in Example 1 was performed except that the carbon black ("SB 910" produced by ASAHI CARBON CO., LTD.) was oxidation-treated to make the average amount of surface acidic functional groups be 0.3 ($\mu$eq/m$^2$). The oxidation-treated carbon black in Example 9 had a DBP oil absorption amount of 55 (ml/100 g) and an STSA of 280 (m$^2$/g). Evaluation results of rubber physical properties in Example 9 are shown in Table 1.

Example 10

In Example 10, the same operation as in Example 1 was performed except that the carbon black ("SB 910" produced by ASAHI CARBON CO., LTD.) was oxidation-treated to make the average amount of surface acidic functional groups be 2.9 ($\mu$eq/m$^2$). The oxidation-treated carbon black in Example 10 had a DBP oil absorption amount of 55 (ml/100 g) and an STSA of 280 (m$^2$/g). Evaluation results of rubber physical properties in Example 10 are shown in Table 1.

Example 11

In Example 11, the same operation as in Example 1 was performed except that the carbon black ("SB 970" produced by ASAHI CARBON CO., LTD.) was oxidation-treated to make the average amount of surface acidic functional groups be 0.3 ($\mu$eq/m$^2$). The oxidation-treated carbon black in Example 11 had a DBP oil absorption amount of 100 (ml/100 g) and an STSA of 270 (m$^2$/g). Evaluation results of rubber physical properties in Example 11 are shown in Table 1.

Example 12

In Example 12, the same operation as in Example 1 was performed except that the carbon black ("SB 970" produced by ASAHI CARBON CO., LTD.) was oxidation-treated to make the average amount of surface acidic functional groups be 0.8 ($\mu$eq/m$^2$). The oxidation-treated carbon black in Example 12 had a DBP oil absorption amount of 100 (ml/100 g) and the STSA of 270 (m²/g). Evaluation results of rubber physical properties in Example 12 are shown in Table 1.

Example 13

In Example 13, the same operation as in Example 1 was performed except that the carbon black ("SB 970" produced by ASAHI CARBON CO., LTD.) was oxidation-treated to make the average amount of surface acidic functional groups be 2.8 (μeq/m²). The oxidation-treated carbon black in Example 13 had a DBP oil absorption amount of 100 (ml/100 g) and an STSA of 270 (m²/g). Evaluation results of rubber physical properties in Example 13 are shown in Table 1.

Example 14

In Example 14, the same operation as in Example 1 was performed except that the carbon black ("SB 320" produced by ASAHI CARBON CO., LTD.) was oxidation-treated to make the average amount of surface acidic functional groups be 1.2 (μeq/m²). The oxidation-treated carbon black in Example 14 had a DBP oil absorption amount of 120 (ml/100 g) and an STSA of 100 (m²/g). Evaluation results of rubber physical properties in Example 14 are shown in Table 1.

Example 15

In Example 15, the same operation as in Example 1 was performed except that the carbon black ("SB 700" produced by ASAHI CARBON CO., LTD.) was oxidation-treated to make the average amount of surface acidic functional groups be 1.2 (μeq/m²) and that pH of the slurry solution was adjusted to 8.5. The oxidation-treated carbon black in Example 15 had a DBP oil absorption amount of 55 (ml/100 g) and an STSA of 120 (m²/g). The particle size distribution of carbon black in the slurry solution of Example 15 was such that D90 (90 volume % particle size)=0.7 μm. Evaluation results of rubber physical properties in Example 15 are shown in Table 1.

[Table 1]

TABLE 1

| | | | | Example | | | | | | | | | | | | | | |
|---|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 | 14 | 15 |
| Filler | Carbon black | DBP | ml/100 g | 55 | 55 | 55 | 55 | 96 | 96 | 96 | 55 | 55 | 55 | 100 | 100 | 100 | 120 | 55 |
| | | SATA | m²/g | 120 | 120 | 120 | 120 | 115 | 115 | 115 | 280 | 280 | 280 | 270 | 270 | 270 | 100 | 120 |
| | | Total acidity/$N_2$SA | μeq/m² | 1.3 | 0.2 | 0.6 | 2.9 | 1.2 | 0.7 | 2.9 | 1.2 | 0.3 | 2.9 | 0.3 | 0.8 | 2.8 | 1.2 | 1.2 |
| Filler slurry | Particle size distribution | D90 | μm | 0.3 | 0.3 | 0.3 | 0.3 | 0.3 | 0.3 | 0.3 | 0.3 | 0.3 | 0.3 | 0.3 | 0.3 | 0.3 | 0.3 | 0.7 |
| | | Concentration | mass % | 10 | ← | ← | ← | ← | ← | ← | ← | ← | ← | ← | ← | ← | ← | ← |
| | | (Solid) | mass part | 60 | ← | ← | ← | ← | ← | ← | ← | ← | ← | ← | ← | ← | ← | ← |
| | | pH | | 10 | ← | ← | ← | ← | ← | ← | ← | ← | ← | ← | ← | ← | ← | 8.5 |
| Polymer latex | Natural rubber latex | (Solid) | mass part | 100 | ← | ← | ← | ← | ← | ← | ← | ← | ← | ← | ← | ← | ← | ← |
| Rubber component | Above carbon masterbatch | | mass part | 160 | ← | ← | ← | ← | ← | ← | ← | ← | ← | ← | ← | ← | ← | ← |
| Chemicals | Process oil | | mass part | 10 | ← | ← | ← | ← | ← | ← | ← | ← | ← | ← | ← | ← | ← | ← |
| | Antioxidant 6PPD | | mass part | 1 | ← | ← | ← | ← | ← | ← | ← | ← | ← | ← | ← | ← | ← | ← |
| | Zinc oxide | | mass part | 3 | ← | ← | ← | ← | ← | ← | ← | ← | ← | ← | ← | ← | ← | ← |
| | Stearic acid | | mass part | 1 | ← | ← | ← | ← | ← | ← | ← | ← | ← | ← | ← | ← | ← | ← |
| | Vulcanization accelerator CBS | | mass part | 1 | ← | ← | ← | ← | ← | ← | ← | ← | ← | ← | ← | ← | ← | ← |
| | Sulfur | | mass part | 2.2 | ← | ← | ← | ← | ← | ← | ← | ← | ← | ← | ← | ← | ← | ← |
| Rubber physical property evaluation | Crack propagation resistance | index | | 110 | 112 | 109 | 108 | 108 | 107 | 106 | 120 | 120 | 118 | 118 | 116 | 115 | 103 | 105 |
| | Heat generating property (tanδ) | index | | 100 | 101 | 98 | 98 | 102 | 100 | 98 | 110 | 108 | 108 | 105 | 103 | 103 | 100 | 99 |

Comparative Example 1

In Comparative Example 1, the same operation as in Example 1 was performed except that the carbon black ("SBX 15" produced by ASAHI CARBON CO., LTD.) was oxidation-treated to make the average amount of surface acidic functional groups be 0.1 ($\mu$eq/m$^2$). The oxidation-treated carbon black in Comparative Example 1 had a DBP oil absorption amount of 100 (ml/100 g) and an STSA of 100 (m$^2$/g). The particle size distribution of carbon black in the slurry solution of Comparative Example 1 was such that D90 (90 volume % particle size)=7.0 $\mu$m. Evaluation results of rubber physical properties in Comparative Example 1 are shown in Table 2.

Comparative Example 2

In Comparative Example 2, the same operation as in Example 1 was performed except that the carbon black ("SBX 15" produced by ASAHI CARBON CO., LTD.) was oxidation-treated to make the average amount of surface acidic functional groups be 3.0 ($\mu$eq/m$^2$). The oxidation-treated carbon black in Comparative Example 2 had a DBP oil absorption amount of 100 (ml/100 g) and an STSA of 100 (m$^2$/g). The particle size distribution of carbon black in the slurry solution of Comparative Example 2 was such that D90 (90 volume % particle size)=0.3 $\mu$m. Evaluation results of rubber physical properties in Comparative Example 2 are shown in Table 2.

Comparative Example 3

In Comparative Example 3, the same operation as in Example 1 was performed except that the carbon black ("SBX 15" produced by ASAHI CARBON CO., LTD.) was oxidation-treated to make the average amount of surface acidic functional groups be 5.0 ($\mu$eq/m$^2$). The oxidation-treated carbon black in Comparative Example 3 had a DBP oil absorption amount of 100 (ml/100 g) and an STSA of 100 (m$^2$/g). The particle size distribution of carbon black in the slurry solution of Comparative Example 3 was such that D90 (90 volume % particle size)=0.2 $\mu$m. Evaluation results of rubber physical properties in Comparative Example 3 are shown in Table 2.

Comparative Example 4

In Comparative Example 4, the same operation as in Example 1 was performed except that the carbon black ("SB 970" produced by ASAHI CARBON CO., LTD.) was oxidation-treated to make the average amount of surface acidic functional groups be 0.1 ($\mu$eq/m$^2$). The oxidation-treated carbon black in Comparative Example 4 had a DBP oil absorption amount of 100 (ml/100 g) and an STSA of 200 (m$^2$/g). The particle size distribution of carbon black in the slurry solution of Comparative Example 4 was such that D90 (90 volume % particle size)=9.0 $\mu$m. Evaluation results of rubber physical properties in Comparative Example 4 are shown in Table 2.

Comparative Example 5

In Comparative Example 5, the same operation as in Example 1 was performed except that the carbon black ("SB 970" produced by ASAHI CARBON CO., LTD.) was oxidation-treated to make the average amount of surface acidic functional groups be 3.0 ($\mu$eq/m$^2$). The oxidation-treated carbon black in Comparative Example 5 had a DBP oil absorption amount of 100 (ml/100 g) and an STSA of 200 (m$^2$/g). The particle size distribution of carbon black in the slurry solution of Comparative Example 5 was such that D90 (90 volume % particle size)=3.0 $\mu$m. Evaluation results of rubber physical properties in Comparative Example 5 are shown in Table 2.

Comparative Example 6

In Comparative Example 6, the same operation as in Example 1 was performed except that the carbon black ("SB 970" produced by ASAHI CARBON CO., LTD.) was oxidation-treated to make the average amount of surface acidic functional groups be 5.0 ($\mu$eq/m$^2$). The oxidation-treated carbon black in Comparative Example 6 had a DBP oil absorption amount of 100 (ml/100 g) and an STSA of 200 (m$^2$/g). The particle size distribution of carbon black in the slurry solution of Comparative Example 6 was such that D90 (90 volume % particle size)=0.3 $\mu$m. Evaluation results of rubber physical properties in Comparative Example 6 are shown in Table 2.

Comparative Example 7

In Comparative Example 7, the same operation as in Example 1 was performed except that the carbon black ("SB 700" produced by ASAHI CARBON CO., LTD.) was oxidation-treated to make the average amount of surface acidic functional groups be 5.0 ($\mu$eq/m$^2$). The oxidation-treated carbon black in Comparative Example 7 had a DBP oil absorption amount of 50 (ml/100 g) and an STSA of 100 (m$^2$/g). The particle size distribution of carbon black in the slurry solution of Comparative Example 7 was such that D90 (90 volume % particle size)=0.3 $\mu$m. Evaluation results of rubber physical properties in Comparative Example 7 are shown in Table 2.

Comparative Example 8

In Comparative Example 8, the same operation as in Example 1 was performed except that the carbon black ("SB 910" produced by ASAHI CARBON CO., LTD.) was oxidation-treated to make the average amount of surface acidic functional groups be 5.0 ($\mu$eq/m$^2$). The oxidation-treated carbon black in Comparative Example 8 had a DBP oil absorption amount of 50 (ml/100 g) and an STSA of 200 (m$^2$/g). The particle size distribution of carbon black in the slurry solution of Comparative Example 8 was such that D90 (90 volume % particle size)=0.3 $\mu$m. Evaluation results of rubber physical properties in Comparative Example 8 are shown in Table 2.

Comparative Example 9

In Comparative Example 9, the same operation as in Example 1 was performed except that the carbon black ("SB 700" produced by ASAHI CARBON CO., LTD.) was oxidation-treated to make the average amount of surface acidic functional groups be 1.2 ($\mu$eq/m$^2$) and that pH of the slurry solution was adjusted to 7.0. The oxidation-treated carbon black in Comparative Example 9 had a DBP oil absorption amount of 50 (ml/100 g) and an STSA of 100 (m$^2$/g). The particle size distribution of the slurry solution of Comparative Example 9 was such that D90 (90 volume % particle size)=3.0 $\mu$m. Evaluation results of rubber physical properties in Comparative Example 9 are shown in Table 2.

[Table 2]

TABLE 2

| | | | | Comparative Example | | | | | | | | |
|---|---|---|---|---|---|---|---|---|---|---|---|---|
| | | | | 1 | 2 | 3 | 4 | 5 | 6 | 7 | 8 | 9 |
| Filler | Carbon black | DBP | ml/100 g | 100 | 100 | 100 | 100 | 100 | 100 | 50 | 50 | 50 |
| | | SATA | m²/g | 100 | 100 | 100 | 200 | 200 | 200 | 100 | 200 | 100 |
| | | Total acidity/ N₂SA | μeq/m² | 0.1 | 3.0 | 5.0 | 0.1 | 3.0 | 5.0 | 5.0 | 5.0 | 1.2 |
| Filler slurry | Particle size distribution | D90 | μm | 7.0 | 0.3 | 0.2 | 9.0 | 3.0 | 0.3 | 0.3 | 0.3 | 3.0 |
| | | Concentration (Solid) | mass % | 10 | ← | ← | ← | ← | ← | ← | ← | ← |
| | | | mass part | 60 | ← | ← | ← | ← | ← | ← | ← | ← |
| | | pH | | 10 | ← | ← | ← | ← | ← | ← | ← | 7.0 |
| Polymer latex | Natural rubber latex | (Solid) | mass part | 100 | ← | ← | ← | ← | ← | ← | ← | ← |
| Rubber component | Above carbon masterbatch | | mass part | 160 | ← | ← | ← | ← | ← | ← | ← | ← |
| Chemicals | Process oil | | mass part | 10 | ← | ← | ← | ← | ← | ← | ← | ← |
| | Antioxidant 6PPD | | mass part | 1 | ← | ← | ← | ← | ← | ← | ← | ← |
| | Zinc oxide | | mass part | 3 | ← | ← | ← | ← | ← | ← | ← | ← |
| | Stearic acid | | mass part | 1 | ← | ← | ← | ← | ← | ← | ← | ← |
| | Vulcanization accelerator CBS | | mass part | 1 | ← | ← | ← | ← | ← | ← | ← | ← |
| | Sulfur | | mass part | 2.2 | ← | ← | ← | ← | ← | ← | ← | ← |
| Rubber physical property evaluation | Crack propagation resistance | index | | 100 | 103 | 98 | 95 | 98 | 95 | 93 | 95 | 95 |
| | Heat generating property (tanδ) | index | | 100 | 105 | 107 | 110 | 105 | 103 | 101 | 105 | 108 |

Various measurements in Examples 16 to 18 and Comparative Examples 10 to 14 were performed by the following methods.

(1) Property Measurement of Carbon Black (STSA (m²/g))

The STSA was measured in accordance with JIS 6217-7:2013.

(2) Frequency of Micronized Slurry Having Particle Size of 1 μm or Less

A proportion of particles having a particle size of 1 μm or less in a slurry solution was calculated by using a laser diffraction scattering particle size distribution measuring device ("MICROTRAC MT300," manufactured by NIKKISO CO., LTD.).

(3) Degree of Dispersion of Carbon Black (X-Value by disperGRADER)

An X-value was calculated using "αview SR" manufactured by ALPHA TECHNOLOGIES, INC. by a method of judging dispersion and determining a particle size distribution of dispersed agglomerates by recognizing protruded portions on a cut face of rubber as dispersion agglomerates, and by comparison of an image of a sample and reference pictures.

(4) Lambourn Abrasion Resistance Index

A Lambourn abrasion resistance index obtained by an abrasion resistance test is shown in terms of an index determined by setting a slip rate to 60% and an index of Comparative Example 10 to 100. The larger the value, the better is the abrasion resistance.

Example 16

(1) Preparation of Slurry Solution

As an oxidation treatment of carbon black, dried carbon black ("AX 015" produced by ASAHI CARBON CO., LTD.) was exposed to a 3% ozone atmosphere. In the oxidation treatment of the carbon black, the treatment temperature was 25° C. and the treatment time was 30 seconds. An STSA of the oxidation-treated carbon black was 146 (m²/g).

A basic aqueous solution was prepared by adding 1.05 kg of a 50% aqueous sodium hydroxide solution to 675 L of water so that an amount of sodium hydroxide became 0.07% by mass relative to a total amount of a slurry. To the basic aqueous solution was added 75 kg of the oxidation-treated carbon black, which was micro-dispersed by means of a high shear mixer ("800 LS" manufactured by SILVERSON MACHINES INC.) to prepare a slurry solution having a carbon black concentration of 10% by mass. Hereat, the pH of the slurry solution was set to 10.7. A frequency of micronized slurry having a particle size of 1 μm or less in the slurry solution obtained herein was 68%.

(2) Preparation of Wet Masterbatch

Into a coagulation tank of 2000 L volume, there were charged 750 kg of the slurry solution prepared in (1) above and 500 L of natural rubber latex having a solid content concentration of 30% by mass, and the mixture was stirred by rotating a stirring blade installed at the bottom of the coagulation tank at a circumferential velocity of 3 m/s to perform mixing and coagulation steps. After 5 minutes from initiation of stirring, formic acid was added thereto as a coagulating agent until the pH became 4.5, followed by further stirring to cause coagulation. The wet coagulated material was dehydrated by a single filter cloth type dehydrator ("MODEL RF 6000," manufactured by YANAGAWA ENGINEERING CO. LTD.) and, thereafter, dried by extrusion using a biaxial extruder ("TEX 65" manufactured by THE JAPAN STEEL WORKS, LTD.) to prepare a wet masterbatch. In this masterbatch, an amount of the carbon black was 50 parts by mass per 100 parts by mass of the natural rubber latex.

(3) Preparation of Rubber Composition

To 160 parts by mass of the wet masterbatch prepared in (2) above, in which carbon black was blended, were added 1 part by mass of an antioxidant (N-phenyl-N'-(1,3-dimethylbutyl)-p-phenylenediamine, "NOCRAC 6C" produced by OUCHI SHINKO KAGAKU KOGYO CO., LTD.), 3 parts by mass of zinc oxide ("ZINC OXIDE (JIS NO. 1))," produced by HAKUSUITECH, CO., LTD.), 1 part by mass of stearic acid (produced by NOF CORPORATION), 1 part by mass of a vulcanization accelerator (N-cyclohexyl-2-benzothiazolyl sulfenamide, "NOCCELER CZ-G" produced by OUCHI SHINKO KAGAKU KOGYO CO., LTD.), and 2.2 parts by mass of sulfur (produced by KARUIZAWA SEIRENSHO CO., LTD.), and the mixture was kneaded by an internal mixer to obtain a rubber composition. The rubber composition obtained was subjected to evaluation of a degree of dispersion of carbon black and abrasion resistance. The results are shown in the following Table 3.

Example 17

In Example 17, the same operation as in Example 16 was performed except that sodium hydroxide was added so that its amount became 0.1% by mass relative to a total amount of the slurry. A frequency of micronized slurry having a particle size of 1 μm or less in the slurry solution in Example 17 was 87%. Evaluation results of rubber physical properties in Example 17 are shown in Table 3.

Example 18

In Example 18, the same operation as in Example 16 was performed except that the carbon black used was one having an STSA of 130 ($m^2/g$) and that sodium hydroxide was added so that its amount became 0.1% by mass relative to a total amount of the slurry. A frequency of micronized slurry having a particle size of 1 μm or less in the slurry solution in Example 18 was 86%. Evaluation results of rubber physical properties in Example 18 are shown in Table 3.

Comparative Example 10

In Comparative Example 10, the same operation as in Example 16 was performed except that, after adding carbon black to water, the mixture was mixed by a high shear mixer and sodium hydroxide was added thereto after 60 minutes from initiation of mixing, and that sodium hydroxide was added so that its amount became 0.1% by mass relative to a total amount of the slurry. A frequency of micronized slurry having a particle size of 1 μm or less in the slurry solution in Comparative Example 10 was 25%. Evaluation results of rubber physical properties in Comparative Example 10 are shown in Table 3.

Comparative Example 11

In Comparative Example 11, the same operation as in Example 16 was performed except that, after adding carbon black to water, the mixture was mixed by a high shear mixer and sodium hydroxide was added thereto after 90 minutes from initiation of mixing, and that sodium hydroxide was added so that its amount became 0.1% by mass relative to a total amount of the slurry. A frequency of micronized slurry having a particle size of 1 μm or less in the slurry solution in Comparative Example 11 was 20%. Evaluation results of rubber physical properties in Comparative Example 11 are shown in Table 3.

Comparative Example 12

In Comparative Example 12, the same operation as in Example 16 was performed except that sodium hydroxide was added so that its amount became 0.04% by mass relative to a total amount of the slurry. A frequency of micronized slurry having a particle size of 1 μm or less in the slurry solution in Comparative Example 12 was 50%. Evaluation results of rubber physical properties in Comparative Example 12 are shown in Table 3.

Comparative Example 13

In Comparative Example 13, the same operation as in Example 16 was performed except that, after adding carbon black to water, the mixture was mixed by a high shear mixer and sodium hydroxide was added thereto after 60 minutes from initiation of mixing, that the carbon black used was one having an STSA of 130 ($m^2/g$), and that sodium hydroxide was added so that its amount became 0.1% by mass relative to a total amount of the slurry. A frequency of micronized slurry having a particle size of 1 μm or less in the slurry solution in Comparative Example 13 was 23%. Evaluation results of rubber physical properties in Comparative Example 13 are shown in Table 3.

Comparative Example 14

In Comparative Example 14, the same operation as in Example 16 was performed except that the carbon black used was one having an STSA of 130 ($m^2/g$) and that sodium hydroxide was added so that its amount became 0.04% by mass relative to a total amount of the slurry. A frequency of micronized slurry having a particle size of 1 μm or less in the slurry solution in Comparative Example 14 was 48%. Evaluation results of rubber physical properties in Comparative Example 14 are shown in Table 3.

[Table 3]

TABLE 3

|  | Comparative Example 10 | Comparative Example 11 | Comparative Example 12 | Comparative Example 13 | Comparative Example 14 | Example 16 | Example 17 | Example 18 |
| --- | --- | --- | --- | --- | --- | --- | --- | --- |
| STSA ($m^2/g$) | 146 | 146 | 146 | 130 | 130 | 146 | 146 | 130 |
| Time from high shear mixer operation to addition of base (min.) | 60 | 90 | 0 | 60 | 0 | 0 | 0 | 0 |
| Frequency of micronized slurry of 1 μm or less (%) | 25 | 20 | 50 | 23 | 48 | 68 | 87 | 86 |
| Mass % of NaOH relative to total amount of slurry solution | 0.1 | 0.1 | 0.04 | 0.1 | 0.04 | 0.07 | 0.1 | 0.1 |
| Degree of dispersion of carbon black (X-value by disperGRADER) | 4.5 | 4.3 | 6.0 | 4.1 | 5.4 | 8.0 | 9.8 | 9.5 |
| Lambourn abrasion resistance index | 100 | 99 | 102 | 99 | 101 | 107 | 111 | 110 |

INDUSTRIAL APPLICABILITY

The method of the present invention for producing a wet masterbatch using oxidation-treated carbon black enables, by using a slurry solution having oxidation-treated carbon black dispersed as a carbon black dispersion slurry solution, micronization of a filler slurry and efficient production of a wet masterbatch having good filler dispersibility without deteriorating a reinforcing property of rubber, rubber physical properties, and the like.

The invention claimed is:

1. A process for producing a wet masterbatch comprising: a step of introducing acidic functional groups on a surface of carbon black by a gas phase ozone treatment performed under an ozone atmosphere of 0.1% or more and 16% or less to produce carbon black having an average amount of surface acidic functional groups ($\mu eq/m^2$) of 0.15 or more and less than 3.00; a step of producing a slurry solution having a pH of 8 or more by dispersing the carbon black; a step of producing a mixture by mixing the slurry solution and a rubber latex solution in a liquid phase; and a step of drying the mixture.

2. The process for producing a wet masterbatch according to claim 1, wherein the carbon black has a DBP oil absorption amount (ml/100 g) of 100 or less.

3. The process for producing a wet masterbatch according to claim 1, wherein the pH of the slurry solution is 9 or more.

4. The process for producing a wet masterbatch according to claim 1, wherein the carbon black has an average amount of surface acidic functional groups ($\mu eq/m^2$) of 0.20 or more and 2.00 or less.

5. The process for producing a wet masterbatch according to claim 1, wherein, when an STSA ($m^2/g$) of the carbon black is 120 or more, the step of producing a slurry solution comprises dispersing the carbon black in a basic aqueous solution prepared by mixing water and a base.

6. The process for producing a wet masterbatch according to claim 5, wherein an amount of the base is, relative to a total amount of the slurry solution, 0.06% by mass or more and 0.1% by mass or less.

7. The process for producing a wet masterbatch according to claim 5, wherein a frequency of micronized slurry having a particle size of 1 µm or less in the slurry solution is 65% or more.

8. A wet masterbatch produced by the process for producing a wet masterbatch according to claim 1.

9. A process for producing a wet masterbatch comprising: a step of producing a slurry solution having a pH of 8 or more by dispersing carbon black having an STSA ($m^2/g$) of 120 or more and an average amount of surface acidic functional groups ($\mu eq/m^2$) of 0.15 or more and less than 3.00 in a basic aqueous solution prepared by mixing water and a base, wherein a frequency of micronized slurry having a particle size of 1 µm or less in the slurry solution is 65% or more; a step of producing a mixture by mixing the slurry solution and a rubber latex solution in a liquid phase; and a step of drying the mixture.

10. The process for producing a wet masterbatch according to claim 9, wherein the carbon black has a DBP oil absorption amount (ml/100 g) of 100 or less.

11. The process for producing a wet masterbatch according to claim 9, wherein the pH of the slurry solution is 9 or more.

12. The process for producing a wet masterbatch according to claim 9, wherein the carbon black has an average amount of surface acidic functional groups ($\mu eq/m^2$) of 0.20 or more and 2.00 or less.

13. The process for producing a wet masterbatch according to claim 9, comprising a step of introducing acidic functional groups on a surface of the carbon black by a gas phase ozone treatment.

14. The process for producing a wet masterbatch according to claim 13, wherein the gas phase ozone treatment is performed under an ozone atmosphere of 0.1% or more and 16% or less.

15. The process for producing a wet masterbatch according to claim 9, wherein an amount of the base is, relative to a total amount of the slurry solution, 0.06% by mass or more and 0.1% by mass or less.

16. A wet masterbatch produced by the process for producing a wet masterbatch according to claim 9.

* * * * *